United States Patent [19]

Honsberg et al.

[11] Patent Number: 5,737,466
[45] Date of Patent: Apr. 7, 1998

[54] ELECTRO-OPTICAL MODULE WITH SIMPLIFIED ADJUSTMENT OF THE ELECTRO-OPTICAL ELEMENTS

[75] Inventors: Martin Honsberg, Aicha Vorm Wald; Volker Plickert; Jörg-R Kropp, both of Berlin, all of Germany

[73] Assignee: Siemens Aktiengesellschaft, Munich, Germany

[21] Appl. No.: 661,076

[22] Filed: Jun. 10, 1996

[30] Foreign Application Priority Data

Dec. 10, 1993 [DE] Germany .................. 43 42 844.4

[51] Int. Cl.⁶ .................................................. G02B 6/36
[52] U.S. Cl. .................................................. 385/89
[58] Field of Search .............................. 385/88, 89, 147

[56] References Cited

U.S. PATENT DOCUMENTS

| | | | |
|---|---|---|---|
| 4,079,404 | 3/1978 | Comerford et al. | 357/17 |
| 4,998,796 | 3/1991 | Bonanni et al. | 385/88 |
| 5,179,609 | 1/1993 | Blonder et al. | 385/89 |

FOREIGN PATENT DOCUMENTS

| | | | |
|---|---|---|---|
| 0 280 305 | 8/1988 | European Pat. Off. | |
| 0 466 134 A3 | 1/1992 | European Pat. Off. | |
| 0466134 | 1/1992 | European Pat. Off. | 385/88 |
| 0 506 438 A1 | 9/1992 | European Pat. Off. | |
| 0 529 947 A1 | 3/1993 | European Pat. Off. | |
| 2 276 493 | 9/1994 | United Kingdom | |
| 2276493 | 9/1994 | United Kingdom | 385/89 |

OTHER PUBLICATIONS

Patent Abstract of Japan 59–217380 (Tetsuo), dated May 25, 1983.

*Primary Examiner*—Akm E. Ullah
*Attorney, Agent, or Firm*—Herbert L. Lerner; Laurence A. Greenberg

[57] ABSTRACT

An electro-optical module includes a substrate having a given surface with first and second lines. An electro-optical unit has a plurality of electro-optical elements being fixed in the first line on the given surface. A corresponding plurality of recesses is formed in the second line on the given surface. Lenses are fixed in the recesses opposite the electro-optical elements, for coupling the electro-optical elements with further optical elements. At least two alignment fixtures are formed on the given surface and are offset from the second line toward the electro-optical unit. Bodies are each disposed in a respective one of the alignment fixtures and act as a mechanical stop for the electro-optical unit.

4 Claims, 1 Drawing Sheet

ELECTRO-OPTICAL MODULE WITH SIMPLIFIED ADJUSTMENT OF THE ELECTRO-OPTICAL ELEMENTS

CROSS-REFERENCE TO RELATED APPLICATION

This application is a Continuation of International Application Serial No. PCT/DE94/01520, filed Dec. 9, 1994.

BACKGROUND OF THE INVENTION

1. Field of the Invention

The invention relates to an electro-optical module having a base or substrate in which a plurality of electro-optical elements are fixed in one line on a surface, a corresponding plurality of recesses are formed in a further line on the same surface, and lenses are fixed in the recesses opposite the electro-optical elements for coupling the electro-optical elements with further optical elements.

An electro-optical module known from Published European Patent Application 0 506 438 A1 includes an electro-optical unit ("LED array") with many light-emitting diodes (LEDs) that are spaced apart next to one another in a line in a predetermined grid pattern on a semiconductor chip. The electro-optical unit is fixed to the surface of a first base or substrate. A corresponding number of lenses is disposed in the same grid spacing in a line in a separate lens carrier ("lens array") which is fixed on a second base or substrate. The latter is fixed on a base plate and aligned relative to the electro-optical unit in such a way that light emerging from the LED is coupled into optical waveguide ends. The module can be used for optical connection of so-called fiber strips which, with a grid spacing of 250 µm, for instance, have twelve individual parallel-extending optical waveguides (channels). Even a slight offset of the second base or substrate relative to the first base or substrate causes considerably worse coupling properties. The known module, which is assembled from a relatively large number of individual components, therefore requires very great effort and expense for positioning an adjustment.

An electro-optical module with a plurality of individual electro-optical elements that are disposed on a first base or substrate is known from Published European Patent Application 0 529 947 A1, corresponding to U.S. Patent No. 5,179,609. A corresponding number of lenses is disclosed, opposite the electro-optical elements, on a second base or substrate. The surfaces of the bases facing one another have corresponding indentations, into which alignment balls can be inserted. That creates a spaced-apart alignment of the second base or substrate, having optical waveguides received by it and having the lenses, relative to the first base or substrate. Precise positioning of the electro-optical elements is carried out by individual alignment of the electro-optical elements with respect to the indentations of the first base or substrate. To that end, solder applied beforehand is briefly liquefied for bonding and fixing the elements on the first base or substrate.

Published European Patent Application 0 280 305 A1, corresponding to U.S. Patent No. 4,875,750, discloses an electro-optical module of the type referred to at the outset with a base or substrate having an upper surface on which a plurality of individual electro-optical elements are disposed in one line with a predetermined grid spacing. Lenses for coupling the elements to optical waveguide ends face the electro-optical elements, on the same upper surface of the base or substrate, and correspond to them in number. In order to retain the lenses, recesses made with the grid spacing are provided between the electro-optical elements and the optical waveguide ends disposed on the same upper surface of the base or substrate or aligned with it. In the known module, active adjustment while the electro-optical elements are put into operation is contemplated for exact positioning of the individual electro-optical elements. However, that requires electrical bonding and positioning with the aid of a three-dimensional manipulator for each individual electro-optical element.

2. Summary of the Invention

It is accordingly an object of the invention to provide an electro-optical module, which overcomes the hereinaforementioned disadvantages of the heretofore-known devices of this general type, which is simple and can be manufactured with relatively few individual parts, which has an especially high coupling efficiency between electro-optical elements and optical elements or optical waveguide ends to be coupled, which has minimal adjustment expense and with which, in particular, it is possible to dispense with active adjustment (while the electro-optical elements are in operation).

With the foregoing and other objects in view there is provided, in accordance with the invention, an electro-optical module, comprising a substrate having a given surface with first and second lines; an electro-optical unit having a plurality of electro-optical elements being fixed in the first line on the given surface; a corresponding plurality of recesses being formed in the second line on the given surface; lenses being fixed in the recesses opposite the electro-optical elements, for coupling the electro-optical elements with further optical elements; at least two alignment fixtures being formed on the given surface and being offset from the second line toward the electro-optical unit; and bodies each being disposed in a respective one of the alignment fixtures and acting as a mechanical stop for the electro-optical unit.

The module according to the invention advantageously makes do with relatively few individual components. Since the lenses and the mechanical stops are disposed directly on the surface of the base or substrate on which the electro-optical unit is also fixed, especially close positional tolerances among the lenses and between them and the electro-optical elements can be adhered to. Suitable base materials include in particular semiconductor materials having surfaces which can be structured with planar methods. Since the masking and etching technique can be well-controlled, the recesses for the lenses and the alignment recesses can be made with high precision by mass production and preferably simultaneously in a joint structuring operation.

As a result, the optically effective spacings from the lenses are defined precisely, and only a lateral displacement of the electro-optical unit is now possible. This kind of adjustment can be performed without operating the electro-optical modules, for instance under a microscope. By varying the positions of the further recesses, the coupling conditions between the remaining lenses and the electro-optical unit and the optical waveguide ends can be defined so as to attain the most favorable coupling efficiency in each case for single-mode and multimode optical waveguides. The module according to the invention is suitable for coupling not only with other corresponding optical elements but also with optical waveguide ends.

In accordance with another feature of the invention, the lenses and the bodies are spherical lenses, and the recesses are recesses in the base or substrate. This feature is especially advantageous from a production standpoint.

In accordance with a further feature of the invention, the spherical lenses are located on edges formed between the recesses and the upper surface of the base or substrate. Thus the location of the lenses is determined by (pointwise) contacts with the edges of the recesses, and lower-level contours of the recesses, especially surface quality and surface inclination, continue not to affect the positions of the lenses. The edges can be made especially precisely with masking techniques.

In accordance with a concomitant feature of the invention, metal structures for electrical connection of the electro-optical elements are mounted on the substrate. This feature of the invention is preferred in terms of bonding the electro-optical elements.

Other features which are considered as characteristic for the invention are set forth in the appended claims.

Although the invention is illustrated and described herein as embodied in an electro-optical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
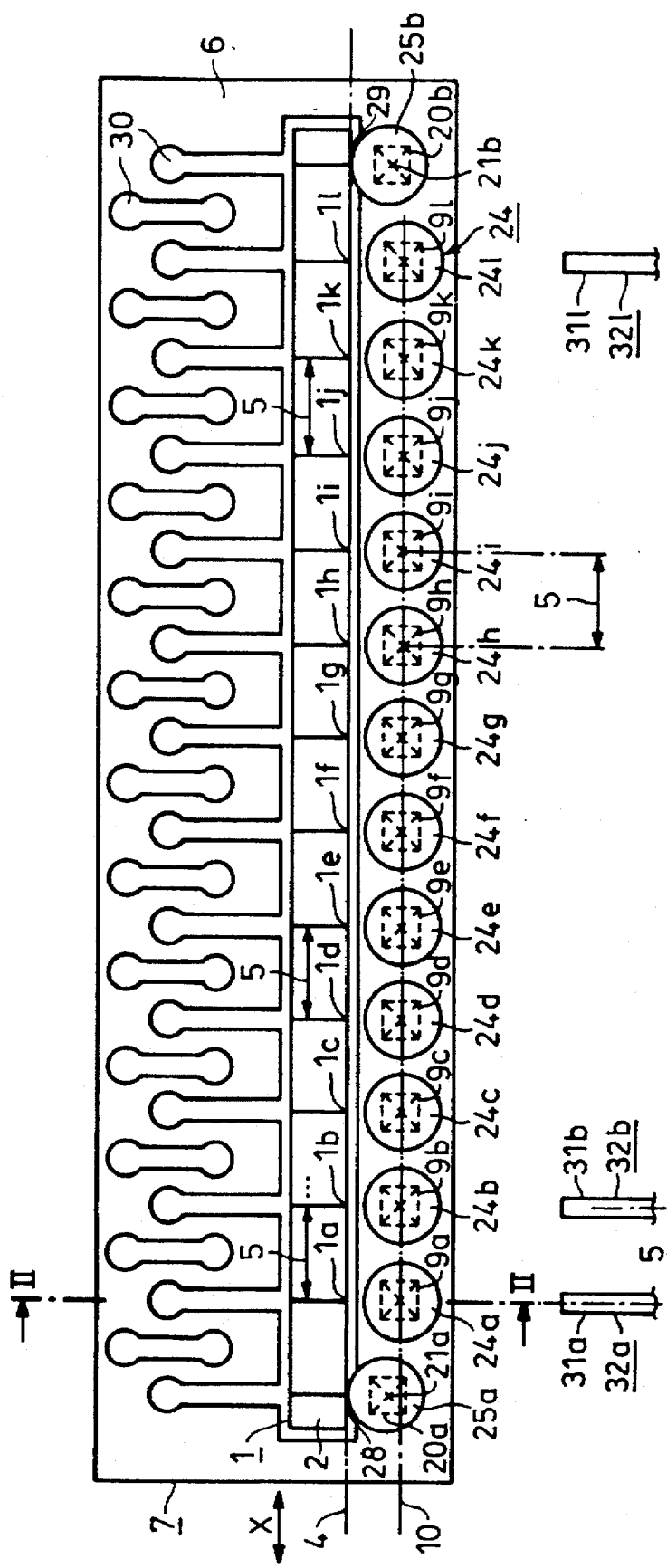
FIG. 1 is a diagrammatic end view of an electro-optical module.
Figure 2:
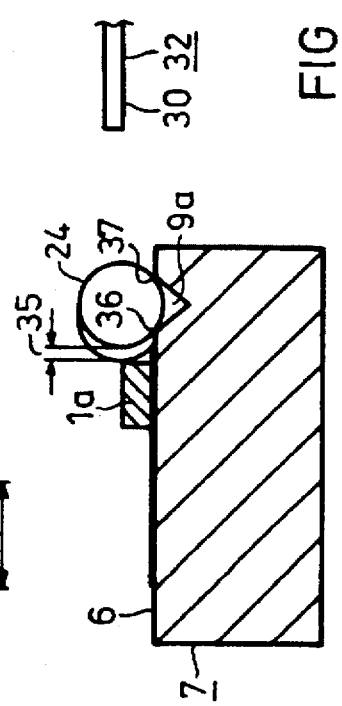
FIG. 2 is a sectional view taken along a line II—II of FIG. 1, in the direction of the arrows.

Referring now in detail to FIGS. 1 and 2 of the drawings as a whole, there is seen an electro-optical module which contains an electro-optical unit 1 that includes a plurality of electro-optical elements (for instance twelve of them) 1a, 1b, 1c, 1d, 1e, 1f, 1g, 1h, 1i, 1j, 1k and 1l. The elements 1a–1l are constructed, for instance, in the manner known from Published European Patent Application 0 506 438 A1, in a single semiconductor strip 2, in the form of individual light-emitting diodes (LEDs) and are spaced apart in a line 4 with a predetermined grid spacing 5 of 250 μm, for instance. The unit 1 ("LED array") is fixed to an upper surface 6 of a base or substrate 7 by soldering and/or adhesive bonding.

A number (for instance twelve) of diagrammatically shown recesses corresponding to the number of elements 1a–1l and taking the form of pyramid-shaped recesses 9a, 9b, 9c, 9d, 9e, 9f, 9g, 9h, 9i, 9j, 9k, 9l, is formed along one row or line 10 on the same surface 6 of the base or substrate 7. The recesses 9a–9l are produced in the same grid spacing 5 with which the elements 1a–1l are also spaced apart by a masking and etching technique that is known per se by anisotropic etching in the base or substrate 7, which is formed of silicon material of suitable orientation. Two further diagrammatically shown pyramid-shaped alignment recesses 20a, 20b have been produced in this same surface 6 of the base or substrate 7, simultaneously with the recesses 9a–9l, by using etching technology that is known per se. The further alignment recesses 20a, 20b are offset from the unit 1 with their centers 21a, 21b in front of the line 10 of recesses 9a–9l.

One respective spherical lens 24a–24l of a lens unit 24 is fixed in each recess 9a–9l, and one respective stop body in the form of a spherical body 25a, 25b is fixed in each of the two further recesses 20a, 20b, for instance by soldering with glass solder, anodic bonding or adhesive bonding. Since the centers 21a, 21b of the alignment recesses 20a, 20b are placed in such a way as to precede the line 10, the spherical lenses 25a, 25b are offset from the unit 1 and each act as a mechanical stop 28, 29 for the unit ("LED array") 1. The electro-optical elements 1a–1l can be electrically bonded by soldering and wire bonding with metal structures 30 that are applied directly onto the base or substrate 7.

The elements 1a–1l can be coupled with optical elements in the form of optical waveguide ends, by the respective spherical lenses 24a–24l that are associated with and face each of them. FIG. 1 diagrammatically shows only three optical waveguide ends 31a, 31b, 31l of optical waveguides 32a, 32b, 32l, which again extend parallel and are spaced apart by the specified grid spacing 5 of 250 μm, for instance, and are disposed substantially in the same plane. The optical waveguide ends 31a, 31b, 31l (for instance twelve in number) may be fixed in a manner that is known per se from U.S. Patent No. 4,998,796 in opposed V-shaped grooves of opposed silicon chips in a multiple optical waveguide plug.

The electro-optical module has an especially high coupling efficiency with comparatively few individual components, because the individual spherical lenses are disposed on the same base or substrate 7 as the unit 1 ("LED array"). Since the recesses 9a–9l that determine the position of the spherical lenses 24a–24l and the further recesses 20a, 20b that determine the position of the spherical lenses 25a, 25b acting as stops are formed jointly on the same base or substrate 7, very close positional tolerances can be adhered to. The further lenses 25a, 25b disposed on the ends of the row or line 10 are offset precisely by a desired amount 35 relative to the line 10 passing through the centers of the other lenses 24a–24l. The lenses rest only on edges 36, 37 which are formed between the surface 6 and the recesses 9a–9l and 20a, 20b as is shown in FIG. 2. The optimal coupling conditions as applicable for single-mode and multimode optical waveguides can be established by adaptation of the focal length and lens spacings. During mounting of the module, the lenses 24a–24l and 25a, 25b are first fixed in the indentations 9a–9l and 20a, 20b, and then the unit 1 is placed on the base or substrate 7. The unit 1 is prepositioned except for a degree of freedom in a direction X, through the use of the stops 28, 29. Adjustment of the electro-optical unit 1 in the lateral direction X can be carried out under a microscope, without active operation of the electro-optical elements 1a–1l.

We claim:

1. An electro-optical module, comprising:

a substrate having a given surface with first and second lines;

an electro-optical unit having a plurality of electro-optical elements being fixed in said first line on said given surface;

a corresponding plurality of recesses being formed in said second line on said given surface;

lenses being fixed in said recesses opposite said electro-optical elements, for coupling said electro-optical elements with further optical elements;

said given surface having at least two alignment recesses formed therein offset from said second line toward said electro-optical unit; and bodies each being disposed in a respective one of said alignment recesses and acting as a mechanical stop for said electro-optical unit.

2. The module according to claim 1, wherein said lenses and said bodies are spherical lenses, and said recesses are recesses in said substrate.

3. The module according to claim 2, wherein said recesses define edges of said given surface, and said spherical lenses are located on said edges.

4. The module according to claim 1, including metal structures mounted on said substrate for electrical connection of said electro-optical elements.

* * * * *

UNITED STATES PATENT AND TRADEMARK OFFICE
CERTIFICATE OF CORRECTION

PATENT NO. : 5,737,466
DATED : Apr. 7, 1998
INVENTOR(S) : Martin Honsberg, et al It is certified that error appears in the above-identified patent and that said Letters Patent is hereby corrected as shown below:

On the title page, Item [63], insert the following:

--Related U.S. Application Data
Continuation of PCT/DE94/01520, Dec. 9, 1994.--

Signed and Sealed this

Fifteenth Day of September, 1998

*Attest:*

BRUCE LEHMAN

*Attesting Officer*   Commissioner of Patents and Trademarks